(12) United States Patent
Fukasaku et al.

(10) Patent No.: US 8,841,806 B2
(45) Date of Patent: Sep. 23, 2014

(54) ELECTRIC MOTOR AND MOTOR-DRIVEN COMPRESSOR USING THE SAME

(75) Inventors: Hiroshi Fukasaku, Aichi-ken (JP); Shinichi Okuyama, Aichi-ken (JP); Tatsuya Horiba, Aichi-ken (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 42 days.

(21) Appl. No.: 13/431,318

(22) Filed: Mar. 27, 2012

(65) Prior Publication Data

US 2012/0248925 A1 Oct. 4, 2012

(30) Foreign Application Priority Data

Mar. 31, 2011 (JP) ................. 2011-079431

(51) Int. Cl.
| | |
|---|---|
| *H02K 3/04* | (2006.01) |
| *H02K 5/22* | (2006.01) |
| *F04B 35/04* | (2006.01) |
| *F04C 23/00* | (2006.01) |
| *F04C 18/02* | (2006.01) |
| *H02K 15/04* | (2006.01) |
| *H02K 3/28* | (2006.01) |
| *F04C 23/02* | (2006.01) |
| *H02K 21/16* | (2006.01) |

(52) U.S. Cl.
CPC *H02K 3/28* (2013.01); *F04B 35/04* (2013.01); *F04C 23/008* (2013.01); *F04C 18/0215* (2013.01); *H02K 15/0457* (2013.01); *F04C 23/02* (2013.01); *H02K 21/16* (2013.01)

USPC ................. 310/71; 310/207; 310/208

(58) Field of Classification Search
CPC ........... H02K 5/22; H02K 3/12; H02K 5/225; H02K 3/522
USPC .............................. 310/207, 208, 71
See application file for complete search history.

(56) References Cited

U.S. PATENT DOCUMENTS

| | | | | |
|---|---|---|---|---|
| 7,083,399 | B2* | 8/2006 | Kurihara et al. | 417/423.7 |
| 7,723,879 | B2* | 5/2010 | Fujii et al. | 310/71 |
| 8,587,177 | B2* | 11/2013 | Kitamura et al. | 310/195 |
| 2004/0004408 | A1* | 1/2004 | Yamazaki et al. | 310/184 |
| 2007/0052307 | A1* | 3/2007 | Yoshida et al. | 310/71 |
| 2009/0200888 | A1* | 8/2009 | Tanaka et al. | 310/195 |
| 2009/0269222 | A1* | 10/2009 | Fukasaku et al. | 417/410.1 |
| 2011/0020153 | A1 | 1/2011 | Murakami | |
| 2011/0025162 | A1* | 2/2011 | Naganawa et al. | 310/195 |

FOREIGN PATENT DOCUMENTS

| | | |
|---|---|---|
| CN | 101566144 A | 10/2009 |
| JP | 2006-187164 A | 7/2006 |
| JP | 2010-059809 A | 3/2010 |

* cited by examiner

*Primary Examiner* — Terrance Kenerly
(74) *Attorney, Agent, or Firm* — Sughrue Mion, PLLC

(57) ABSTRACT

An electric motor includes a rotary shaft, a rotor fixed on the rotary shaft, and a stator having plural slots in which coils of different phases are wound. Each of the coils has at least one pair of end wires. At least in the coil located closest to the rotor, one of the end wires located farther from the rotor than the other of the end wires is used as a lead wire that is to be electrically connected to a driver circuit for energizing the coils.

3 Claims, 4 Drawing Sheets

ELECTRIC MOTOR AND MOTOR-DRIVEN COMPRESSOR USING THE SAME

BACKGROUND OF THE INVENTION

The present invention relates to an electric motor including a stator that has three-phase coils wound thereon, and also to a motor-driven compressor using the electric motor.

There is known a motor-driven compressor for use in a vehicle air conditioner, in which an electric motor driven by three-phase ac (alternating current) power to drive the compression mechanism is received in the compressor housing. The electric motor includes a stator having three-phase coils wound thereon, a rotor having permanent magnets, and a rotary shaft rotating with the rotor. Each of the three-phase coils wound on the stator has a pair of end wires. Of the six end wires, three end wires of different phases are tied together as neutral point and fastened to the periphery of the stator, and the other three end wires are used as lead wires. The lead wires are drawn out of the stator after the forming of the coil end. In drawing the lead wires, however, part of the lead wire may enter the space for the rotor. Such lead wire may interfere with the rotor when the rotor and the stator are assembled together, thereby resulting in lead wire breaking.

Japanese Unexamined Patent Application Publication No. 2010-59809 discloses a motor-driven compressor in which a three-phase synchronous electric motor received in the housing is driven by three-phase ac power supplied from the inverter thereby to drive the compression mechanism. The electric motor includes a rotary shaft connected to the compression mechanism, a rotor fixed on the rotary shaft, and a stator fixed in the housing. An inverter housing is mounted to the end wall of the housing to form therein an inverter space where the inverter is provided. The lead wires drawn out from the respective three-phase coils on the stator are connected through a motor harness to a hermetic terminal that is in turn connected to the inverter. The above-cited publication No. 2010-59809 also discloses a structure in which the lead wires are connected to a cluster block that is previously mounted on the periphery of the stator in the housing so as to facilitate the connection between the lead wires and the hermetic terminal.

In the electric motor disclosed in the publication No. 2010-59809, part of the lead wires drawn out from the respective three-phase coils may enter the rotor space. Such lead wire may interfere with the rotor when the rotor and the stator are assembled, which may cause the enamel coating of the lead wire to be scratched and hence lower the insulation performance of the lead wire, thereby resulting in lead wire breaking.

Particularly in the above-described structure in which the cluster block is mounted on the periphery of the stator, the lead wires of the respective coils need to be bent for connection to the cluster block. Such bending of lead wire is required not only in the case that the lead wire is connected to the cluster block after the cluster block is mounted on the periphery of the stator, but also in the case that the cluster block previously connected to the lead wire is mounted on the periphery of the stator.

Part of the lead wire thus bent adjacent to the coil may enter the space for the rotor, and also may interfere with the rotor when the rotor and the stator are assembled, thereby resulting in lead wire breaking. Such problem may occur particularly in the lead wire of the coil whose coil end is located closest to the rotor among the three-phase coils.

The present invention is directed to preventing the lead wire of the coil wound on the stator of an electric motor from entering the space for the rotor of the electric motor.

SUMMARY OF THE INVENTION

In accordance with an aspect of the present invention, an electric motor includes a rotary shaft, a rotor fixed on the rotary shaft, and a stator having plural slots in which coils of different phases are wound. Each of the coils has at least one pair of end wires. At least in the coil located closest to the rotor, one of the end wires located farther from the rotor than the other of the end wires is used as a lead wire that is to be electrically connected to a driver circuit for energizing the coils.

Other aspects and advantages of the invention will become apparent from the following description, taken in conjunction with the accompanying drawings, illustrating by way of example the principles of the invention.

DETAILED DESCRIPTION OF THE EMBODIMENTS

Figure 1:
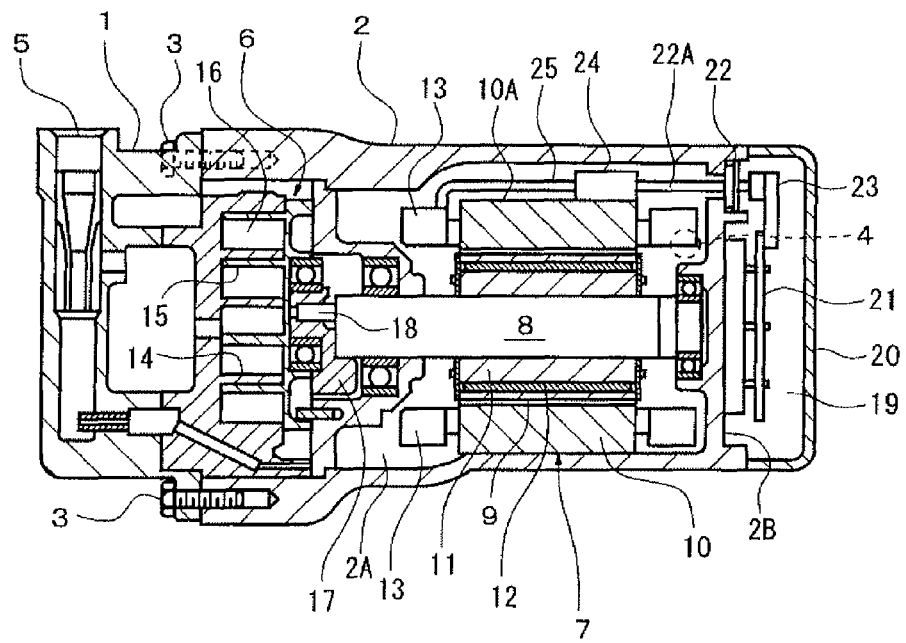
FIG. 1 is a longitudinal sectional view of a scroll-type motor-driven compressor using an electric motor according to an embodiment of the present invention.

The following will describe the scroll-type motor-driven compressor according to the embodiment of the present invention with reference to FIGS. 1 through 5. Referring to FIG. 1, the motor-driven compressor includes a front housing 1 and a rear housing 2 which are fixed to each other by bolts 3 thereby to form a hermetically sealed compressor housing. The front housing 1 and the rear housing 2 are both made of metal such as aluminum or aluminum alloy and formed with an outlet port 5 and an inlet port 4, respectively, which are connected to an external refrigerant circuit (not shown).

A scroll compression mechanism 6 and an electric motor 7 for driving the compression mechanism 6 are received in the interior space 2A of the front and rear housings 1, 2. The electric motor 7 has a rotary shaft 8 rotatably supported in the rear housing 2 by way of bearings, a rotor 9 fixed on the rotary shaft 8, and a stator 10 fixed on the inner wall of the rear housing 2 around the rotor 9. The rotor 9 includes a rotor core 11 composed of a plurality of laminated magnetic steel plates, and plural permanent magnets 12. The stator 10 has three-phase coils 13 wound thereon.

The compression mechanism 6 is mainly composed of a fixed scroll 14 fixed on the inner walls of the front and rear housings 1, 2, and a movable scroll 15 disposed in facing relation to the fixed scroll 14 thereby to form therebetween a compression chamber 16 for compressing refrigerant, the volume of which is variable. The movable scroll 15 is connected through a bearing and an eccentric bush 17 to an eccentric pin 18 of the rotary shaft 8 and orbits about the fixed scroll 14 with the rotation of the rotary shaft 8 so as to vary the volume of the compression chamber 16.

An inverter housing 20 is fixedly mounted on the end wall 2B of the rear housing 2 to form therein an inverter space 19. In the inverter space 19, an inverter 21 for driving the electric motor 7 and a hermetic terminal 22 electrically connected to the inverter 21 through a connector 23 are mounted on the end wall 2B of the rear housing 2. In the interior space 2A of the rear housing 2, the hermetic terminal 22 having a conductive terminal pin 22A is electrically connected to a cluster block 24 mounted on the outer surface 10A of the stator 10 and electrically connected to lead wires 25 that are drawn from the respective coils 13 on the stator 10.

The cluster block 24 previously connected to the lead wires 25 is mounted on the outer surface 10A of the stator 10, which allows the conductive terminal pin 22A of the hermetic terminal 22 to be automatically connected to the lead wires 25 through the cluster block 24 merely by mounting of the hermetic terminal 22A to the end wall 2B. Thus, the structure of the present embodiment wherein the cluster block 24 is previously mounted to the stator 10 facilitates the assembling of the motor-driven compressor. In such motor-driven compressor, when three-phase ac power is supplied from the inverter 21 through the hermetic terminal 22 and the lead wires 25 to the coils 13 of the electric motor 7, the rotor 9 is rotated with the rotary shaft 8 thereby to drive the compression mechanism 6.

Figure 2:
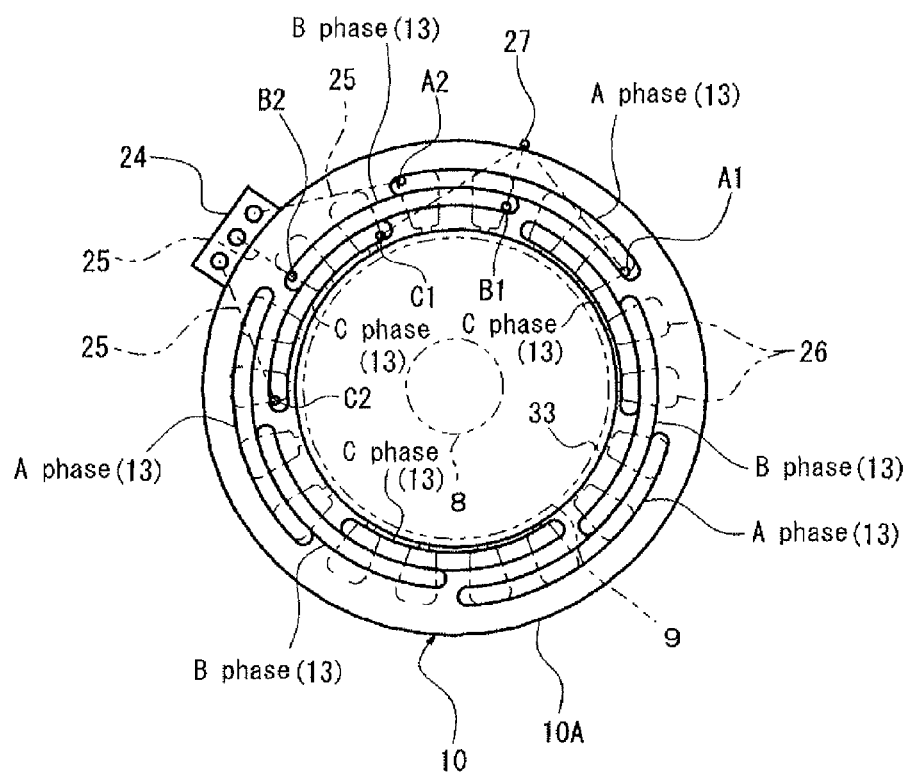
FIG. 2 is a schematic view showing an end of a stator of the electric motor of FIG. 1 and also coil ends of three-phase coils wound on the stator.

FIG. 2 is a schematic view showing an end of the stator 10 of the three-phase electric motor 7 when the rotor 9 has six poles and the stator 10 has eighteen slots 26, and also showing the appropriately formed coil ends of the three-phase coils 13 wound on the stator 10 in wave winding technique. As shown in the drawing, the A-phase, B-phase and C-phase coils 13 corresponding to the U-phase, V-phase and W-phase, respectively, of three phase ac power are wound in their associated slots 26 of the stator 10. When forming the coil ends, the coil end of the A-phase coil 13 is located at a position farthest from the rotor 9, while the coil end of the C-phase coil 13 is located at a position closest to the rotor 9, as seen in radial direction of the rotor 9. The coil end of the B phase coil 13 is located between the coil ends of the A-phase and C-phase coils 13.

Each of the wound coils 13 has the starting end and the finishing end that are at different positions with respect to the thickness direction of the coil 13, or as seen in radial direction of the stator 10. In other words, each of the A-phase, B-phase and C-phase coils 13 has a pair of end wires, one of which is located closer to the rotor 9 than the other of the end wires. Of the end wires drawn from the respective A-phase, B-phase and C-phase coils 13, the end wires A1, B1 and C1 that are closer to the rotor 9 are used as the end wires for the neutral point 27, and such three wires are tied together and held to the outer surface 10A of the stator 10. On the other hand, the end wires A2, B2 and C2 that are farther from the rotor 9 are used as the lead wires 25 that are to be electrically connected to driver circuit components such as the inverter 21 and the hermetic terminal 22, and the ends of such lead wires 25 are connected to the cluster block 24 mounted on the outer surface 10A of the stator 10.

Figure 3:
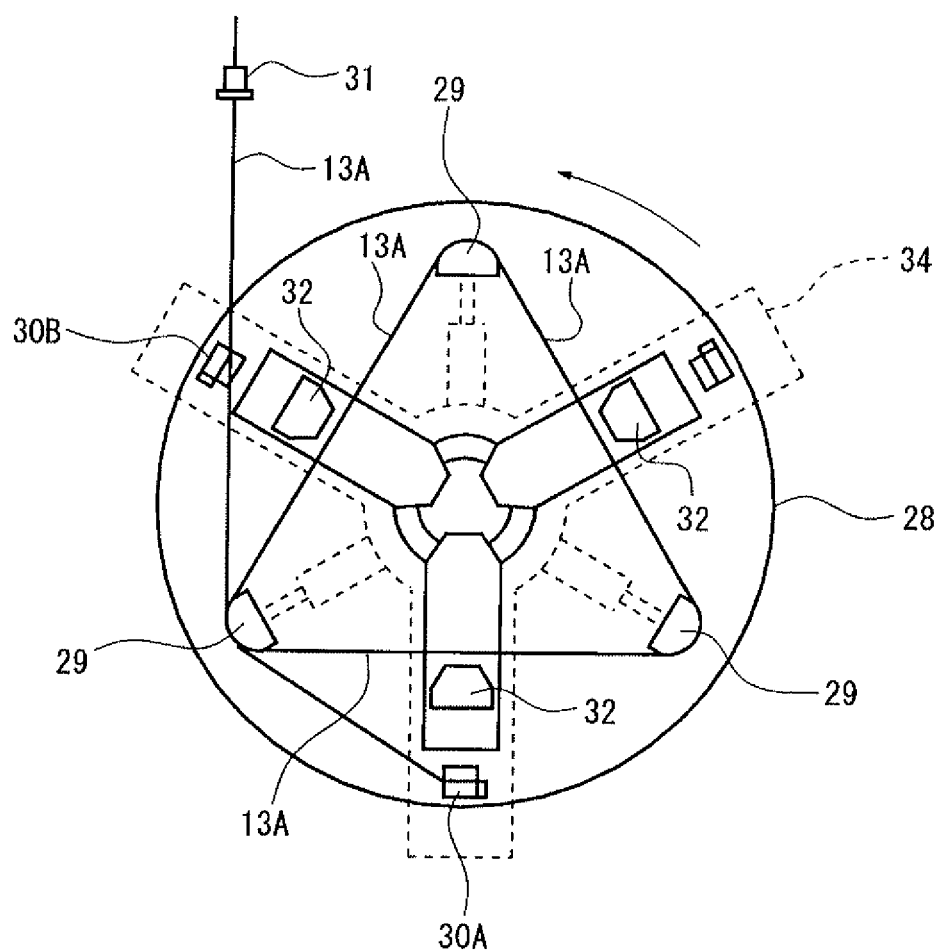
FIG. 3 is a schematic plan view explaining a process of winding the coil.
Figure 4:
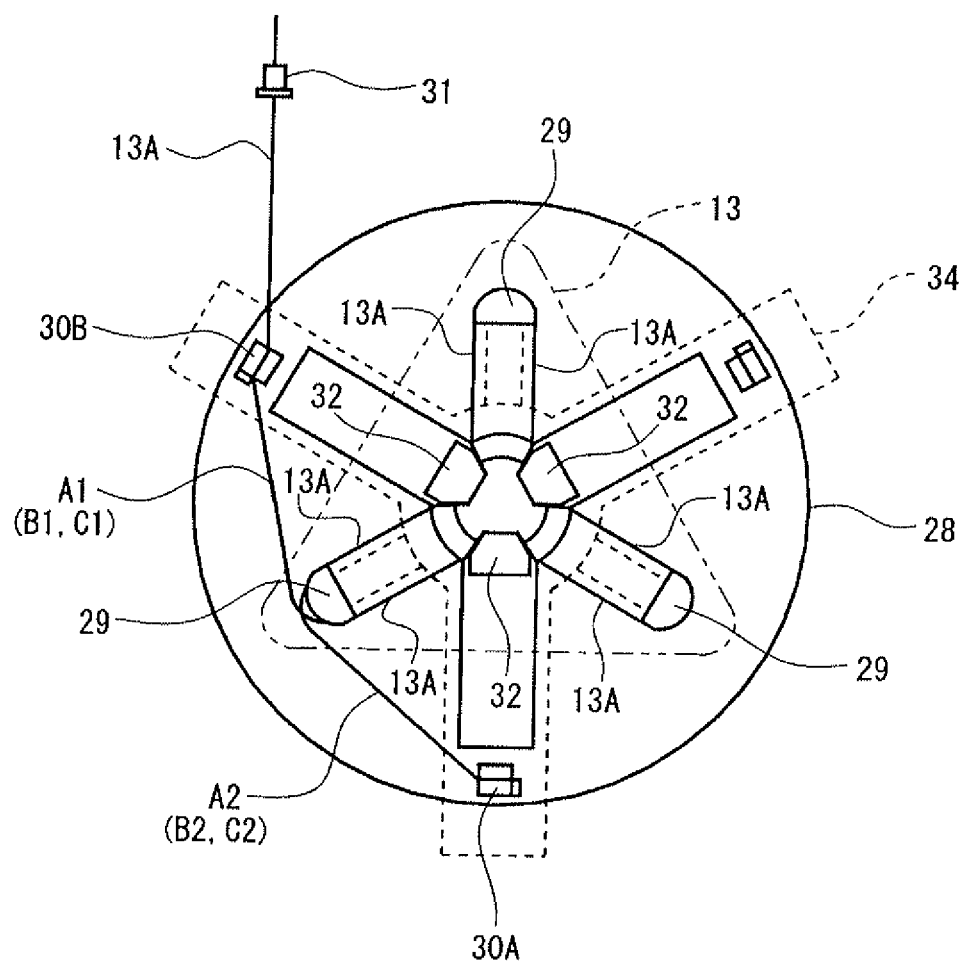
FIG. 4 is a schematic plan view explaining a process of forming the wound coil into a star shape.
Figure 5:
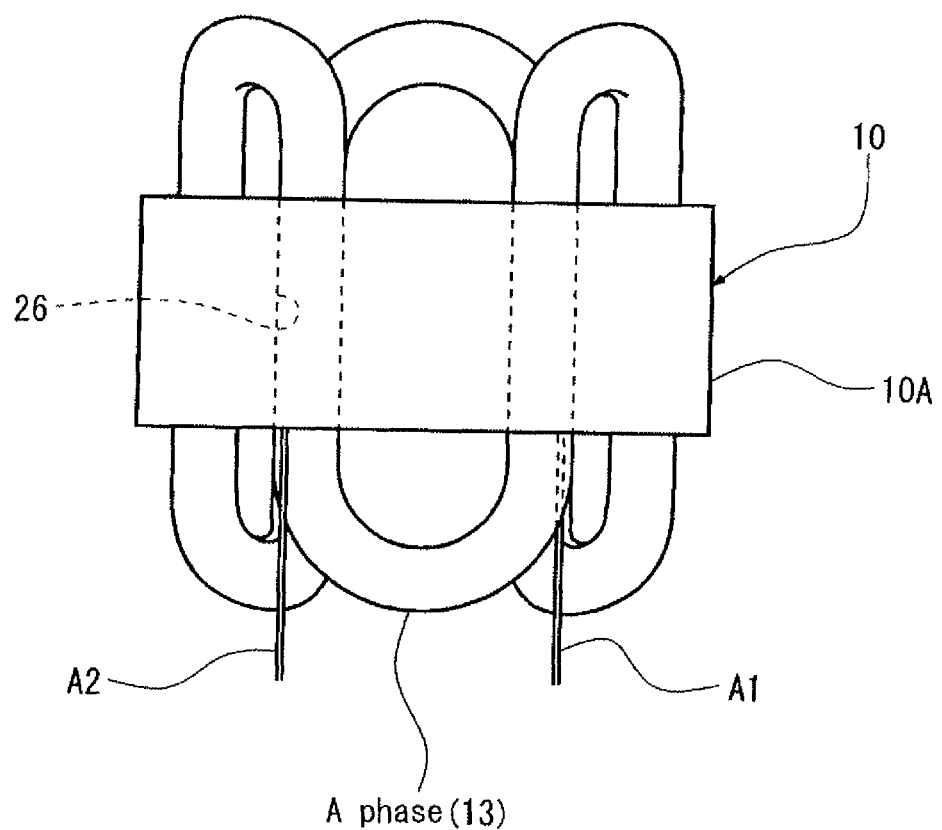
FIG. 5 is a schematic front view of A-phase coil inserted in the slots of the stator.

Each of the A-phase, B-phase and C-phase coils 13 is wound using the process shown in FIGS. 3 and 4, and then wound in their associated slots 26 of the stator 10 in wave winding technique, as shown in FIG. 5. The following will describe the process of winding the A-phase coil 13. FIG. 3 shows a device used for winding an enamel wire 13A into the coil 13. The winding device includes a circular reel body 28 rotating in the direction indicated by arrow, a base 34 fixed to the bottom of the reel body 28, and three reel frame 29 movable on the base 34 in radial direction of the reel body 28. With the enamel wire 13A fastened at the starting end thereof to the holder 30A of the reel body 28, the enamel wire 13A supplied through the nozzle 31 is wound spirally around the respective reel frames 29 with the rotation of the reel body 28, into a triangular shape in plan view. After completion of the winding of the enamel wire 13A around the reel frames 29, the enamel wire 13A is fastened at the finishing end thereof to the holder 30B of the reel body 28 (see FIG. 4). In this way, the coil 13 is wound.

Then, as shown in FIG. 4, three moving frames 32 each provided on the base 34 at a position between any two reel frames 29 are moved toward the center of the reel body 28 so as to press the periphery of the coil 13 radially inward, so that the coil 13 of a triangular shape indicated by phantom line is formed into the coil 13 of a star shape indicated by solid line. While the coil 13 is being formed into a star shape, the reel frames 29 are also moved in synchronization with the movement of the moving frames 32 toward the center of the reel body 28 at a speed that is low enough to keep the tension of the coil 13. The coil 13 thus formed into a star shape is cut at a position between the holder 30B and the nozzle 31.

The coil 13 of a star shape is removed away from the reel body 28 and set on a coil inserting jig (not shown). After that, the coil 13 is wound in wave winding technique in any selected six slots 26 of the stator 10 that are angularly spaced at an equal interval, i.e. wound in every other two slots 26 (see FIG. 5), while pulling the center part of the star shaped coil 13, or the part of the coil 13 pressed radially inward by the moving frames 32, by using the jig in the direction opposite to the direction in the reel body 28 is removed. The coil end of the A-phase coil 13 projecting from the end of the stator 10 is formed such that the coil end is located radially outward of the stator 10, thereby facilitating the subsequent insertion of the B-phase and C-phase coils 13. The B-phase and C-phase coils 13 are also wound in the same manner as in the case of the A-phase coil 13 described with reference to FIGS. 3 and 4, and then inserted in the associated six slots 26. The coil ends of the respective coils 13 are formed in the same manner.

In the process of FIG. 3, the enamel wire 13A is wound spirally away from the reel body 28, and the starting end and the finishing end of the coil 13 are used as the end wires A2, A1 of FIG. 2, respectively. The coil 13 having such end wires A1, A2 is formed into a star shape using the process of FIG. 4, and then inserted in the associated slots 26 of the stator 10, as shown in FIG. 5, so that the end of the coil 13 fastened to the holder 30A serves as the end wire A2, and the end of the coil 13 fastened to the holder 30B serves as the end wire A1. Similarly, the ends of the B-phase and C-phase coils 13 fastened to the holder 30A serve as the end wires B2, C2 of FIG. 2, and the ends of the B-phase and C-phase coils 13 fastened to the holder 30B serves as the end wires B1, C1 of FIG. 2.

Thus, the end wires A2, B2 and C2 are located in their associated slots 26 at a position that is deeper than the end wires A1, B1 and C1, respectively. In other words, the end wires A2, B2 and C2 are located farther from the rotor 9 than the end wires A1, B1 and C1, respectively, as seen in the radial direction of the rotor 9. The end wires A2, B2 and C2 are held between the inner wall of the slots 26 and the coils 13 from which the end wires A2, B2 and C2 are drawn. This prevents the end wires A2, B2 and C2 from moving radially inward of the stator 10 and hence from entering the space 33 for the rotor 9.

Particularly in the present embodiment wherein the cluster block 24 is mounted on the outer surface 10A of the stator 10, the lead wires 25 or the end wires A2, B2 and C2 need to be previously connected to the cluster block 24. In this case, the lead wires 25 are bent at a sharp angle radially outward of the stator 10, so that a large force is applied to the bend of the lead wire 25 radially inward of the stator 10. In the present embodiment, however, the lead wire 25 that is a part of the coil 13 is prevented by the coil 13 itself from entering the space 33 and hence from interfering with the rotor 9 when the stator 10 and the rotor 9 are assembled together, so that the enamel coating of the lead wire 25 is prevented from being scratched and hence from being broken.

It is to be understood that the present invention is not limited to the above-described embodiments, but it may be modified in various ways as exemplified below without departing from the scope of the invention.

(1) In FIG. 2, the presence of the B-phase and C-phase coils 13 prevents the end wires A1, A2 of the A-phase coil 13 from entering the space 33 for the rotor 9. Similarly, the presence of the C-phase coil 13 prevents the end wires B1, B2 of the B-phase coil 13 from entering the space 33. Thus, any one of the end wires A1, A2 may be used for the lead wire 25 of the A-phase coil 13, and any one of the end wires B1, B2 may be used for the lead wire 25 of the B-phase coil 13. The use of at least the end wire C2 for the lead wire 25 of the C-phase coil 13 that is located closest to the rotor 9 prevents the lead wires 25 of the respective coils 13 from entering the space for the rotor 9.

(2) The coil 13 may be wound not only in wave winding but also in concentric winding as one kind of distributed winding, or in any other suitable winding techniques such as concentrated winding.

(3) The coil 13 may be wound not only using the single enamel wire 13A but also using plural enamel wires. In this case, the number of end wires of each coil 13 is not two, but two times n, where n is the number of the enamel wires 13A used for winding the coil 13. The number of end wires on one side that is closer to the rotor is n, and the number of end wires on the opposite side is n.

(4) The cluster block 24 may be provided freely in the interior space 2A of the rear housing 2 without being mounted on the stator 10.

(5) The inverter 21 may be mounted not only on the rear end wall 2B of the rear housing 2, but also on the outer peripheral surface of the rear housing 2. In such a case, the cluster block 24 may be mounted on the outer surface 10A of the stator 10, or may be provided freely in the interior space 2A of the rear housing 2 without being mounted on the stator 10.

(6) Although in the above embodiment the electric motor 7 is of inner rotor type wherein the rotor 9 is located radially inside the stator 10, the present invention is applicable also to an electric motor of outer rotor type wherein the rotor is located radially outside the stator.

(7) Although in the above embodiment of the electric motor 7 the number of poles of the rotor 9 is six and the number of slots of the stator 10 is eighteen, the poles and the slots are not limited to such numbers, but, for example, the number of poles of the rotor may be four and the number of slots of the stator may be twelve.

(8) Although in the above embodiment the electric motor 7 is located in the region to be exposed to the refrigerant introduced from the inlet port 4, the electric motor 7 may be located in the region exposed to the refrigerant discharged from the outlet port 5.

(9) The present invention is applicable not only to a motor-driven scroll type compressor, but also to any other types of motor-driven rotary compressor such as a vane compressor and a screw compressor, and also to motor-driven reciprocating compressors such as a swash-plate compressor and a wobble-plate compressor.

What is claimed is:

1. An electric motor, comprising:
   a rotary shaft;
   a rotor fixed on the rotary shaft; and
   a stator having plural slots in which coils of different phases are wound, the coils each having at least one pair of end wires extending therefrom respectively,
   wherein, at least in the coil located closest to the rotor, a first one of the end wires located farther from the rotor than a second one of the end wires is used as a lead wire that is to be electrically connected to a driver circuit for energizing the coils,
   wherein the lead wires of the respective coils are connected directly to a cluster block that is mounted on an outer surface of the stator,
   wherein the lead wire of the coil located closest to the rotor extends to the cluster block across the rest of the coils,
   wherein the first one of the end wires of one of the respective coils is located in one of the slots on as to be disposed between an inner wall of the slot and the respective coil, so that the first one of the end wires is located in the one of the slots farther from the rotor than the second one of the end wires located in a second one of the slots, as viewed in a radial direction of the rotor.

2. The electric motor according to claim 1, wherein the coils are wound in wave winding technique.

3. A motor-driven compressor, comprising:
   a compression mechanism;
   the electric motor according to claim 1, wherein the rotary shaft is connected to the compression mechanism; and
   a housing receiving the compression mechanism and the electric motor.

* * * * *